United States Patent [19]

Hoppe et al.

[11] 4,210,506

[45] Jul. 1, 1980

[54] COATING BATH FOR THE CATAPHORETIC COATING OF METALLIC SURFACES

[75] Inventors: Karl Hoppe; Udo Strauss, both of Münster, Fed. Rep. of Germany

[73] Assignee: BASF Farben & Fasern Aktiengesellschaft, Hamburg, Fed. Rep. of Germany

[21] Appl. No.: 921,081

[22] Filed: Jun. 30, 1978

Related U.S. Application Data

[63] Continuation of Ser. No. 637,029, Dec. 2, 1975, abandoned.

[30] Foreign Application Priority Data

Dec. 5, 1974 [DE] Fed. Rep. of Germany ....... 2457437

[51] Int. Cl.$^2$ .............................................. C25D 13/10
[52] U.S. Cl. .................................................. 204/181 C
[58] Field of Search ...................................... 204/181 C

[56] References Cited

U.S. PATENT DOCUMENTS

| | | | |
|---|---|---|---|
| 3,454,482 | 7/1969 | Spoor et al. | 204/181 C |
| 3,682,814 | 8/1972 | Gilchrist | 204/181 C |
| 3,922,212 | 11/1975 | Gilchrist | 204/181 C |
| 3,984,299 | 10/1976 | Jerabek | 204/181 C |
| 4,001,155 | 1/1977 | Kempter et al. | 204/181 C |

*Primary Examiner*—Howard S. Williams
*Attorney, Agent, or Firm*—Gilbert L. Wells

[57] ABSTRACT

Coating bath and method for cataphoretic coating of metallic iron surfaces from aqueous solutions and/or aqueous dispersions of salts of cationic film-forming agents. An additional content of metallic ions from metallic salts is dissolved in the coating bath, the potential of which in the electrolytic voltage series of the cations is higher than the potential of the iron metal surfaces.

15 Claims, No Drawings

COATING BATH FOR THE CATAPHORETIC COATING OF METALLIC SURFACES

CROSS-REFERENCE TO A RELATED APPLICATION

This is a continuation, of application No. 637,029, filed Dec. 2, 1975, now abandoned.

Applicants claim priority under 35 U.S.C. 119 for Application P No. 24 574 37.6, filed Dec. 5, 1974 in the Patent Office of the Federal Republic of Germany.

BACKGROUND OF THE INVENTION

The field of the invention is chemistry, electrical and wave energy wherein non-metals in an aqueous bath are coated on a metal base.

The present invention is particularly related to a coating bath for the cataphoretic coating of metallic surfaces, which contains aqueous solutions and/or aqueous dispersions of salts of cationic film-forming agents. Furthermore, the invention concerns the production of the coating bath and its use for the preparation of coatings by cataphoresis, in order to impart to the coatings an improved adhesion and to ensure an improved corrosion protection for the coated metallic surfaces.

The state of the art of cataphoretic coating of metallic surfaces and the bath compositions used therein may be ascertained by reference to U.S. Pat. Nos. 3,230,162 and 3,455,806; U.S. Pat. Application Ser. No. 193,591 of Robert Jerabek et al, filed Oct. 28, 1971; and West German Published Applications 2,320,301 and 2,357,075; the disclosures of which are incorporated herein.

In general, electrically conductive workpieces, preferably of iron or other metals, are subjected to a pretreatment before the anaphoretic or cataphoretic coating step. This pretreatment is, in most cases, a complicated multistage process for the purpose of providing the surface to be coated with sufficient corrosion protection and for taking care of a sufficiently firm adhesion of the coating thus deposited. Normally, iron surfaces receive as the pretreatment a phosphating process with zinc phosphate, zinc calcium phosphate, or iron phosphate. Due to the complicated control of the various phosphating methods, such a pretreatment is susceptible to disturbances and has the disadvantage of strong fluctuations with respect to maintaining the coating weight, the structure of the phosphating layer, etc. With respect to optimum operating conditions, the concentrations of the layer-forming substances, the accelerators, the temperature, and the pH value are criteria which can be accurately maintained only with great expenditure of time and money.

Other possible pretreatment methods, such as for example, the chromatizing method, moreover make it difficult to accurately predict the attainable corrosion protection and adhesion.

Although during the phosphating dip difficultly accessible parts of a workpiece are also wetted by the phosphating solution, so that a layer formation can be effected also at these locations, an entrainment of foreign ions is particularly great in this process due to strongly scooping parts, so that the subsequent electrophoretic dip coating bath is thereby contaminated and a considerable reduction in the quality of the coating can occur.

It is known in the method of spray-phosphating that there is no film formation at all, or only an incomplete film formation at difficulty accessible places, such as, for example, in cavities, due to the type of process involved.

It is an object of the present invention to overcome the aforedescribed disadvantages inherent in the normally customary pretreatment and optionally entirely omit the pretreatment by phosphating, without impairing the corrosion protection effect of the electrophoretic dip coating.

SUMMARY OF THE INVENTION

Having in mind the limitations of the prior art, it has now been found that the above-mentioned disadvantages can be avoided by means of a coating bath for the cataphoretic coating of metallic iron surfaces based upon aqueous solutions and/or aqueous dispersions of salts of cationic film-forming agents, where the bath contains additionally metallic ions from metallic salts dissolved in the coating bath, the potential of which in the electrolytic voltage series of the cations is higher than the potential of the metallic iron surface.

A preferred embodiment for the coating bath provides that the metallic ion concentration from metallic salts dissolved in the coating bath amounts to 1–2,000 p.p.m., based on the cationic film-forming agent present in the coating bath. The designation "p.p.m." is understood to mean parts per million.

The present invention likewise relates to the process of preparing the coating bath based upon aqueous solutions and/or aqueous dispersions of salts of cationic film-forming agents which additionally contains metallic ions from metallic salts dissolved in the coating bath, the potential of which in the electrolytic voltage series of the cations is higher than the potential of the metallic iron surfaces.

A further object of the present invention is the use of the coating bath according to the present invention for the production of coatings on metallic iron surfaces connected as the cathode by cataphoresis and subsequent curing of the coating.

These coatings are prepared by cataphoresis with the use of the coating bath according to the present invention, wherein at the beginning of the cataphoretic deposition of the cationic film-forming agent, metals from the dissolved metallic salts are electrolytically deposited on the metallic iron surface connected as the cathode.

In a modified embodiment, the coatings are obtained by dipping the metallic iron surface to be coated without the use of current into the coating bath and then conducting the cataphoretic deposition of the cationic film-forming agent.

It is also possible to effect a spraying of the metallic iron surface to be coated with the bath fluid of the coating bath, before the cataphoretic deposition is carried out.

In an especially preferred embodiment, the coatings are prepared by adjusting the bath concentration of the additional metallic ions by the use of metallic anodes connected as auxiliary electrodes, and maintaining this concentration at a constant value. The auxiliary anode, in this connection, consists of the same metal contained in the form of the salt in the coating bath. During the passage of the current through the coating bath, the same amount of the anode is dissolved as is deposited on the cathode.

The present invention provides, for the first time, in a simple manner a reliable improvement of the corrosion protection of coating films on metallic iron substrates and of the adhesion to the metallic surfaces produced by cataphoretic deposition. In many cases, a conventional phosphating step and the defects inherent therein can be omitted. Yet, the corrosion protection and adhesion are substantially improved. Especially, the present invention safely avoids the disadvantages encountered during the spray-phosphating method wherein, as is known, internal parts of cavities cannot be rendered sufficiently corrosion-proof. Also spot welding seams, which ordinarily do not accept a phosphating solution, are coated flawlessly with firm adhesion and protected from corrosion in accordance with the present invention. Accordingly, this invention permits an essential simplification of the coating methodology, which is equal to an extraordinary advance in the art.

DESCRIPTION OF THE PREFERRED EMBODIMENTS

Metallic irons within the scope of the present application are understood to mean iron, steel, and iron alloys with other metals, for example the various steel types.

The deposition of synthetic resins by means of cataphoresis is conventional. In this process, the electrically conductive workpieces are connected as the cathode, on which the cationic film-forming agents are deposited as a coating. In contrast to the anaphoretic deposition, no metallic ions from the metallic surface to be coated enter the solution. The binders for the cataphoresis to be deposited are normally basic or amphoteric homo- and/or copolymers, polycondensates and/or polyaddition products and/or combinations of the three aforementioned classes.

No protection is desired for the production and use of these cationic film-forming agents. Such products are described, for example, in U.S. Pat. Nos. 3,230,162 and 3,455,806; U.S. Patent Application Ser. No. 193,591 of Robert Jerabek et al, filed Oct. 28, 1971; French Pat. No. 1,313,355 and West German Published Applications No. 2,320,301 and 2,357,075. Normally, all synthetic resins which can be deposited by cataphoresis are suitable.

Furthermore, no protection is desired, either, for the preparation of the aqueous solutions and/or aqueous dispersions of salts of such cationic products. Such preparation takes place in the usual manner according to the conventional methods. For example, solutions of the binders in organic solvents can be dissolved or dispersed in water by combination with suitable organic or inorganic acids. In general, it is advantageous to adjust the pH of the solutions or dispersions to a value of between 1 and at most 9, preferably between 3 and 8.5. This is generally the case if 0.2–1.5 acid equivalents of the acid component are present per base equivalent of the cationic compound.

Usable as the acid component which functions as the anion in cataphoretically depositable binders are practically all known inorganic and/or organic acids or acid derivatives. Examples in this connection are hydrochloric acid, sulfuric acid, phosphoric acid, acetic acid, formic acid, citric acid, lactic acid, maleic acid, phthalic acid, as well as many other acids or the anhydrides thereof or compounds acting as an acid in the dissociated form.

In the aqueous coating bath, the cationic film-forming agents are either present by themselves or in combination with other water-soluble and/or water-dispersable synthetic resins cataphoretically depositable in a mixture with the cationic film-forming agents. Examples of suitable synthetic resins are aminoplast condensates, phenoplast condensates, epoxy resins, alkyd resins, polyurethanes, or mixtures of these and other synthetic resins. The amount by weight of these additional other synthetic resins suitably is not to be larger in general than the amount by weight of the salts of the cataphoretically depositable binders. As customary in connection with other coating compositions, the coating bath can likewise contain auxiliary agents capable of being deposited electrophoretically, such as, for example, pigments, fillers, curing catalysts, agents to improve the flow, defrothers, adhesion-promoting agents, and others.

If required, additional solvents can be used, such as, for example, alcohols, such as isopropanol, butanol, or also others, such as tetrahydrofuran, aliphatic and/or aromatic hydrocarbons, esters, ethers, ether esters, and other compounds, to exert a favorable effect on the solubility and dispersion properties in the coating bath.

According to the present invention, the coating bath additionally contains metallic ions from metallic salts dissolved in the coating bath, the potential of which in the electrolytic voltage series of the cations is higher than the potential of the metallic iron surfaces.

The potentials of the metallic ions in the voltage series of the cations are conventional and can be derived, for example, from the manual "Ullmanns Encyklopaedie der technischen Chemie" [Ullmann's Encyclopedia of Technical Chemistry]6 (1955), publishers Urban & Schwarzenberg Verlag, Munich-Berlin, P. 441. This voltage series indicates, as is known, the extent to which electrode potentials are nobler or ignobler than the potential of electrodes ranging therebelow or thereabove.

Suitable ions, the potential of which in the voltage series of the cations is higher than the potential of iron, and which are suitable for the coating bath of this invention, are, for example, the ions of copper, silver, cobalt, cadmium, nickel, tin, antimony, To supply the ions to the coating bath, the corresponding soluble metal salts are dissolved in the coating bath. Thus, it is possible to employ, for instance, soluble sulfates, nitrates, acetates, formates, lactates, phosphates, chlorides, and many others.

To attain an effective result, the concentration of the additional metallic ions to be used according to the present invention in the coating bath can be maintained at a very low value. Thus, concentrations of between 1 and 2,000 p.p.m., based on the amount of the cationic film-forming agent present in the coating bath are already sufficient. This means that per 1,000 g. of cationic film-forming agent, only amounts of between 1 mg. and 2 g. of metallic ions need to be contained in the coating bath to substantially improve the corrosion protection values of the coated metallic iron sheet. If the concentrations of metallic ions in the coating bath are higher, the corrosion-protective effect is no longer essentially increased as compared to the concentrations of between 1 and 2,000 p.p.m. The preferred and optimum concentration range is between 1 and 2,000 p.p.m. The production of the metallic ion concentration is effected indirectly simply by dissolving the corresponding metallic salts directly in the coating bath or by adding an aqueous solution of the metallic salts to the coating bath or by direct incorporation into a concentrate of the cataphoretically depositable film-forming agent.

During the cataphoretic deposition, the coating bath is also depleted in the metal ions, since the latter are also deposited on the cathode in metallic form. In order to maintain the metal ion concentration in the coating bath, it is necessary, therefore, to add to the coating bath new metal ions in the form of the salts to the extent to which metals are deposited.

To adjust the metal ion concentration in dependence on the deposition conditions and to maintain this concentration constant, a particularly preferred embodiment of the coating process includes the use of auxiliary electrodes connected as the anode. These electrodes are metallic anodes consisting of the same metal corresponding to the metal ions used according to the present invention in the coating bath. In this method, basically the same effect is achieved as with the use of water-soluble metallic salts, but the possibility is provided, especially in case of valuable metals, of conducting a controlled metering of the compound.

For producing the required metal ion concentration in the coating bath, normally those metallic salts are utilized which are readily available and wherein the valence of the metals is chosen so that the salts are present in the most stable form, for example copper as copper (II) acetate, copper (II) sulfate, copper (II) nitrate; cobalt as cobalt (II) nitrate; cadmium as cadmium (II) acetate; zinc nickel as nickel (II) acetate; tin as tin (II) chloride; antimony as antimony (III) chloride; chromium as chromium (III) acetate. When weighing the metallic salts for feeding purposes, the content of water of crystallization of the individual salts must furthermore be taken into account.

The additional content of metal ions, the potential of which in the electrolytic voltage series of the cations is higher than the potential of the iron metal surfaces has the effect that, before the beginning of the cataphoretic deposition of the film-forming agent, metals from the dissolved metallic salts are electrolytically deposited on the metallic iron surface connected as the cathode.

If desired, the procedure can also be such that the metallic surface to be coated is first dipped, without the use of electric current, into the coating bath and only after it has been completely immersed is the deposition voltage applied. Here again, a deposition of metal ions takes place on the metallic surface. As a modification thereof, it is also possible to apply the coating bath initially by spraying during a certain time period, with the coating fluid running back into the coating bath.

The conditions for the cataphoretic deposition are those customary in practice. For example, the coatings are deposited at the usual d.c. voltages of between 2 and 450 volts, preferably 50–250 volts, and at a temperature of preferably between 20° and 40° C. within a time period of 0.5–5 minutes. Depending on the cationic film-forming agent employed, coatings are obtained having a layer thickness of 10–40 microns. After the coating step is terminated, the metallic iron surfaces thus coated are withdrawn from the coating bath, suitably rinsed with water, and heated for curing purposes for 5–180 minutes to temperatures of 80°–250° C. so that the coatings are baked in. During this procedure, the baking time decreases with increasing temperature. The best results are attained at baking temperatures of between 120° and 190° C. and baking times of between 40 and 15 minutes.

In a particular embodiment of the present invention the cationic film-forming agent is a reaction product of an epoxy resin with a Mannich base from a condensed phenol, a secondary amine carrying a hydroxyalkyl group, and formaldehyde.

In another embodiment, the cationic film-forming agent is a copolymer wherein the following components have been incorporated by polymerization:

(a) 3–50 percent by weight of at least one mono- or bicyclic compound with a five- to six-membered heterocycle containing 1–3 hetero atoms, one of which is a nitrogen atom, carrying a vinyl group;

(b) 3–30 percent by weight of at least one amide, alkyl amide, hydroxyalkyl amide and/or oxaalkyl amide of methacrylic acid;

(c) 20–94 percent by weight of at least one alkyl ester of methacrylic acid and/or at least one alkylene benzene, as well as optionally, in addition:

(d) no more than 30 percent by weight of at least one other ethylenically unsaturated comonomer.

The following examples more fully explain the present invention without limiting the same. The parts indicated therein are parts by weight, unless stated otherwise. The percentages are in percent by weight.

EXAMPLES

PREPARATION OF THE CATIONIC FILM-FORMING AGENT A

A cationic resin is prepared in accordance with West German Published Application 2,320,301, representing a Mannich condensation product on the basis of a reaction product of a modified bisphenol A resin of formaldehyde and secondary amines with epoxy resins.

At 20°–25° C., 984 parts (13.1 moles) of formalin, 40 percent, is added dropwise to 1,100 parts (4.8 moles) of bisphenol A, 917.5 parts (8.7 moles) of diethanolamine, 332.5 parts (2.5 moles) of di-2-methoxyethylamine, and 375 parts of isopropanol. The reaction mixture is agitated at 30° C. for one hour and then heated for 3 hours to 80° C. Under a slight vacuum, isopropanol and water are removed by distillation, thus obtaining a Mannich condensation product in the form of a yellow, resinous mass having a solids content of 91 percent.

A mixture is formed from 2,542 parts of this Mannich condensation product and 70 parts of paraformaldehyde and condensed at 70° C. for 9–10 hours. A viscous mass having a solids content of 90 percent is thus obtained.

Of this product, 544 parts of the Mannich base is reacted with 136.5 parts of a commercially available reaction product of bisphenol A and epichlorohydrin (epoxy value: 0.2) (epoxy resin "Epoxy 1/33" by Chemapol) and 54.5 parts of a commercial reaction product of pentaerythritol and epichlorohydrin (epoxy value: 0.57) ("Epoxin 162" BASF AG) with the use of 34 parts of dimethyl glycol ether for 3 hours at 60° C.

A clear, viscous resin is thus produced having an average molecular weight of 860 and a residual formaldehyde content of 0.3 percent. The solids content is 70 percent.

PREPARATION OF THE CATIONIC FILM-FORMING AGENT B

A cataphoretically depositable film-forming agent is produced according to the disclosure of U.S. Patent Application Ser. No. 193,591 as follows:

100 parts of a polyglycidyl ether of bisphenol A (epoxy equivalent weight 910, m.p. 96°-104° C., hydroxyl value 0.14)

is dissolved in 367.2 parts of N-methylpyrrolidone and
244.8 parts of 4-methoxy-4-methylpentanone and added to 517.0 parts of a partially masked diisocyanate, prepared by reacting 148.0 parts of toluene-2,4-diisocyanate with
260.5 parts of 2-ethylhexanol.

This mixture is heated, after adding 5 drops of dibutyl tin dilaurate as the catalyst, to 100° C. until no free isocyanate groups can be detected.

Thereafter, the reaction mixture is cooled to 60° C. and 79.2 parts of diethylamine is added thereto. The mixture is then again heated to 100° C. and this temperature maintained for 2 hours. After cooling, a spontaneously cross-linking polyurethane resin, which can be cataphoretically deposited, is obtained having a solids content of 73.5 percent.

PREPARATION OF THE CATIONIC FILM-FORMING AGENT C

A cataphoretically depositable film-forming agent is produced in accordance with Example 1 of U.S. Pat. No. 3,455,806.

A solution of a copolymer, prepared by solution polymerization in the usual way and consisting of:

200 parts of N-vinylimidazol
250 parts of the 2-oxahexylamide of acrylic acid
300 parts of the 2-ethylhexyl ester of acrylic acid
200 parts of styrene
50 parts of the 4-hydroxybutyl ester of acrylic acid in 1000 parts of butanol is neutralized with hydrochloric acid to a pH of 5.2. The solids content is about 50 percent.

EXAMPLE 1 (Comparative Example)

To produce a coating bath, 385 parts by weight of the cataphoretically depositable film-forming agent A is neutralized with 2 percent by weight of glacial acetic acid, based on the solids content of the film-forming agent A. Thereafter, 221 parts by weight of a pigment paste homogenized on a three-roller mill is added thereto, this paste consisting of:

366 parts by weight of the aforedescribed film-forming agent A, mixed with acetic acid,
174 parts by weight of talc,
45 parts by weight of carbon black,
90 parts by weight of aliphatic fatty alcohols of 10-14 carbon atoms,
325 parts by weight of isopropanol.

The mixture is diluted to a solids content of 12 percent by weight of deionized water and agitated, prior to the beginning of the deposition, for 48 hours at 30° C. The pH of the diluted coating bath is 7.9. This coating bath is divided into two portions.

Into the one portion is immersed a degreased steel plate (1a) as the cathode, and into the other portion is immersed a zinc-phosphated steel plate (1b) as the cathode.

The procedure is then continued in the same way with both coating baths:

After the cathodes have been immersed, the coating step is carried out for 2 minutes at a d.c. voltage of 220 volts. The coating bath is maintained at a temperature of 30° C. during the depositing step. Then the coated cathodes are removed from the coating bath, rinsed with deionized water, and blow-dried with air. Then, the plates are baked for 20 minutes at 190° C. The thus baked coating on the degreased steel plate (1a) has a layer thickness of 26 microns; the baked-in coating on the zinc-phosphated plate has a layer thickness of 16 microns. The zinc-phosphated steel plate has a zinc phosphate layer of about 2 g./m$^2$.

The corrosion protection values of the coatings obtained according to (1a) and (1b) are indicated in the Table hereinbelow.

EXAMPLES 2-11

In coating bath A, varying amounts of metallic salts are dissolved so that the metal ion concentration from the added metallic salts in the coating bath is 100-500 p.p.m., based on the solid binder. The following metal salts are employed:

Example 2 copper (II) acetate, $Cu(CH_3.CO_2)_2.H_2O$
Example 3 copper (II) sulfate, $CuSO_4.5H_2O$
Example 4 copper (II) nitrate, $Cu(NO_3)_2.6H_2O$
Example 5 cobalt (II) nitrate, $Co(NO_3)_2.6H_2O$
Example 6 cadmium (II) acetate, $Cd(CH_3CO_2)_2.2H_2O$
Example 7 zinc (II) acetate, $Zn(CH_3.CO_2)_2.2H_2O$
Example 8 nickel (II) acetate, $Ni(CH_3.CO_2)_2$
Example 9 stannous chloride, $SnCl_2$
Example 10 antimony trichloride, $SbCl_3$
Example 11 chromium (III) acetate, $Cr(CH_3.CO_2)_3$ The cataphoretic coating and the baking step are conducted in the same manner as described in Example 1. Also, analogously to Example 1, the cataphoretic coating is executed on (a) a degreased steel plate and
(b) a zinc-phosphated steel plate having a zinc phosphate layer of about 2 g./m$^2$.

The corrosion resistance of the baked coatings was tested by the salt spray test according to ASTM-B-117-64. The thus-obtained hidden rusting values after a treatment time of 96 hours, 168 hours, and 240 hours are compiled in the Table.

| Example | Metallic Salt Dissolved in the Coating Bath | Metal Ion Concentration in Coating Bath in p.p.m. (Based on Solid Binder) | Hidden Rusting in mm. According to ASTM-B-117-64 | |
|---|---|---|---|---|
| | | | Degreased Steel Plate (a) | Zinc-Phosphated Steel Plate (b) |
| | | | 96 h. | 168 h. | 240 h. |
| 1 | | 0 | >10 | >15 | 1.5 |
| 2 | $Cu(CH_3.CO_2)_2.H_2O$ | 100 | 3 | 4 | 0.5 |
| | | 200 | 2 | 2.5 | 0.5 |
| | | 300 | 1.5 | 2 | 0.5 |
| | | 400 | 1.0 | 1.5 | 0.5 |
| | | 500 | 1.5 | 1.5 | 0.5 |
| 3 | $CuSO_4.5H_2O$ | 100 | 1 | 2 | 0.5 |

-continued

| Example | Metallic Salt Dissolved in the Coating Bath | Metal Ion Concentration in Coating Bath in p.p.m. (Based on Solid Binder) | Hidden Rusting in mm. According to ASTM-B-117-64 | | |
|---|---|---|---|---|---|
| | | | Degreased Steel Plate (a) | | Zinc-Phosphated Steel Plate (b) |
| | | | 96 h. | 168 h. | 240 h. |
| | | 200 | 0.5 | 1 | 0.5 |
| | | 300 | 0.5 | 1 | 0.5 |
| | | 400 | 1 | 1.5 | 0.5 |
| | | 500 | 1.5 | 2 | 0.5 |
| 4 | Cu(NO$_3$)$_2$ . 6 H$_2$O | 300 | 1.5 | | 1 |
| 5 | Co(NO$_3$)$_2$ . 6 H$_2$O | 300 | 2.5 | | 1.5 |
| 6 | Cd(CH$_3$ . CO$_2$)$_2$ . 2 H$_2$O | 300 | 2 | | 1 |
| 7 | Zn(CH$_3$ . CO$_2$)$_2$ . 2 H$_2$O | 300 | 2.5 | | 1 |
| 8 | Ni(CH$_3$ . CO$_2$)$_2$ | 300 | 2.5 | | 1 |
| 9 | SnCl$_2$ | 300 | 2 | | 1.5 |
| 10 | SbCl$_3$ | 300 | 3 | | 1 |
| 11 | Cr(CH$_3$ . CO$_2$)$_3$ | 300 | | | |

It can be seen from the Table that the addition of the metallic salts to the coating bath substantially reduces the hidden rust values, corresponding to an improved corrosion protection.

In many cases, the phosphating step can even be eliminated. With the use of zinc-phosphated metal sheets, a remarkable improvement in the corrosion protection is obtained according to the process of this invention.

EXAMPLE 12

The following coating bath is prepared:
A. 280 parts of the cationic film-forming agent B (with a solids content of 73.5 percent) is combined with
  4 parts of dibutyl tin dilaurate as the catalyst and then mixed with
  15 parts of glacial acetic acid.
B. To this mixture A is added
  130 parts of a pigment paste homogenized on a roller mill, consisting of:
  366 parts of mixture A,
  174 parts of talc,
  45 parts of carbon black,
  90 parts of aliphatic fatty alcohols of 1–10 carbon atoms,
  325 parts of isopropanol.

The mixture is diluted in the usual manner with deionized water to a solids content of 9 percent. The pH of the bath is 4.5.

This coating bath is utilized to coat cathodically
(a) a degreased steel plate and
(b) a zinc-phosphated steel plate.

The deposition process is carried out for 90 seconds at a d.c. voltage of 100 volts. After the specimens have been removed from the bath, they are rinsed with deionized water and blow-dried with air. The coating is then baked for 10 minutes at 177° C. The layer thicknesses were, in case of (a): 20 microns and, in the case of (b); 13 microns. The film had a pencil hardness of 4 H.

If the cathodic deposition is conducted in the presence of the metallic salts employed in Examples 2–10, at the same concentrations, then analogous values are obtained for the hidden rusting, in accordance with ASTM-B-117-64.

EXAMPLE 13.

A coating bath is produced as follows:
300 parts of the cationic film-forming agent C (solids content 50 percent) is combined with
100 parts of a pigment paste homogenized on a three-roller mill, consisting of
400 parts of the cationic film-forming agent C (solids content 50 percent),
180 parts of talc,
45 parts of carbon black,
90 parts of aliphatic fatty alcohols of 10–14 carbon atoms,
122 parts of isopropanol.

The bath is diluted with deionized water in the usual way to a solids content of 10 percent. The pH of the bath is adjusted to 3.5 with hydrochloric acid.

This coating bath is used for the cataphoretic coating of
(a) a degreased steel plate,
(b) a zinc-phosphated steel plate.

The deposition process is conducted for 1 minute at a d.c. voltage of 20 volts. After the specimens have been removed from the bath, they are rinsed with deionized water and blow-dried with air. The coating is then baked for 20 minutes at 170° C. The layer thicknesses are, in case of (a): 22 microns and, in case of (b): 16 microns.

If the cataphoretic deposition is conducted in the presence of the metallic salts listed in connection with Examples 2–10, in identical concentrations, analogous values are obtained for the hidden rusting according to ASTM-B-117-64.

The Examples demonstrate that the results attained with the metallic salts utilized according to this invention in the coating bath are independent of the type of cationic film-forming agent employed.

EXAMPLE 14.

According to West German Published Application No. 1,357,075, a cationic enamel bath is prepared as follows:

Under nitrogen as the protective gas, 533 parts (4.25 moles) of 24 percent formaldehyde solution in isobutanol is added dropwise at 20°–25° C. to 375.0 parts (1.65 moles) of bisphenol A, 260.0 parts (2.48 moles) of diethanolamine, 215.0 parts (1.67 moles) of di-n-butylamine, and 200 parts of isopropanol. The reaction mixture is then agitated for 30 minutes at 30° C. and thereafter heated for 3 hours to 80° C. Then the mixture is combined with 150.0 parts of a commercial reaction product of pentaerythritol and epichlorohydrin (epoxy value: 0.57) ("Epoxin 162" BASF AG) and 375 parts of a commercial reaction product of bisphenol A and epichlorohydrin (epoxy value: 0.2) ("Epoxy 1/33" by Chemapol), together corresponding to 1.61 molar equivalents of epoxy groups; the charge is then maintained for 5 hours at 70° C., and 170.0 parts of an acetylene diurea-formaldehyde condensation product ("Plastigen G" BASF) is introduced under agitation. A clear resin is obtained having a solids content of 67.3 percent. The average molecular weight is 1,000–1,300.

891.0 g. of the above-described cationic binder and 180.0 g. of a pigment paste, consisting of 178.0 g. of the binder protonated with 2.4 g. of acetic acid, 125.0 g. of talc, and 14.3 g. of carbon black, is combined with 11 g. of acetic acid and diluted with fully demineralized water to 6 liters of an approximately 12 percent enamel bath. The pH of the bath is 8.5 at 30° C. After the bath has been aged for 3 days at 30° C. to remove the solvent, a degreased steel sheet I, connected as the cathode, is immersed in the bath at a voltage of 250 volts, with the use of a counter anode of steel (surface area 200 cm$^2$); the degreased steel sheet I has the same size as this counter anode. The coating step is then conducted for 2 minutes. Thereafter, the counter anode is replaced by a counter anode of metallic cobalt, having a size of 340 cm$^2$, and another 24 steel sheets are coated, as described above. After these deposition steps, the bath contains 40 p.p.m. of cobalt in dissolved (complexed) form. A strain on the dispersion (glass runoff) is not observed.

The steel sheets 1 and 23, 24 are exposed, after baking for 20 minutes at 200° C., to the ASTM salt spray test for 96 hours.

| Corrosion Results | |
|---|---|
| | 96 hours ASTM-B-117-64 |
| Degreased steel sheet 1 (comparative experiment) | 10–12 mm |
| Degreased steel sheet 23 | 1–2 mm |
| Degreased steel sheet 24 | 1–2 mm |

We claim:

1. In a process for the production of coatings on metallic iron surfaces by dipping said surfaces into a coating bath in which is maintained a direct current between an anode and a cathode, said metallic iron surfaces being the cathode, said coating bath containing an aqueous solution or an aqueous dispersion of salts of cationic film-forming agents with an acid, the improvement which comprises said cationic film-forming agents selected from the group consisting of:
   (1) a reaction product of an epoxy resin with a Mannich base from a condensed phenol, a secondary amine carrying a hydroxyl group and formaldehyde;
   (2) reaction products of epoxy resin with a diisocyanate; or
   (3) a copylymer wherein the following components have been incorporated by polymerization:
      (a) 3–50 percent by weight of at least one mono- or bicyclic compound with a five- to six-membered heterocycle containing 1–3 hetero atoms, one of which is a nitrogen atom, carrying a vinyl group;
      (b) 3–30 percent by weight of at least one amide, alkyl amide, hydroxyalkyl amide and oxaalkyl amide of methacrylic acid or acrylic acid; and
      (c) 20–94 percent by weight of at least one alkyl ester of methacrylic acid or acrylic acid and/or at least one alkylene benzene;
   and said cationic film-forming agents containing metallic ions from metallic salts selected from the group of metallic ions, the potential of which in the electrolytic voltage series of the cations being higher than the potential of the iron metal surfaces, said metallic salts being selected from the group consisting of copper (II) acetate, copper (II) sulfate, copper (II) nitrate, cobalt (II) nitrate, cadmium (II) acetate, zinc (II) acetate, nickel (II) acetate, tin (II) chloride, antimony (III) chloride and chromium (III) acetate, said metallic ions having an ion concentration from said metallic salts dissolved in said coating composition of 1–2000 parts per million, based on the amount of said cationic film-forming agents present in said coating compositions.

2. The process of claim 1, wherein said cationic film-forming agents are said reaction products (2).

3. The process of claim 1, wherein said cationic film-forming agents are said copolymer (3).

4. The article electrocoated by the method of claim 1.

5. The process of claim 1, wherein said cationic film-forming agents are said reaction product (1).

6. The process of claim 5, wherein said metallic salts are copper (II) acetate.

7. The process of claim 5, wherein said metallic salts are copper (II) nitrate.

8. The process of claim 5, wherein said metallic salts are copper (II) sulfate.

9. The process of claim 5, wherein said metallic salts are cobalt (II) nitrate.

10. The process of claim 5, wherein said metallic salts are cadmium (II) acetate.

11. The process of claim 5, wherein said metallic salts are zinc (II) acetate.

12. The process of claim 5, wherein said metallic salts are nickel (II) acetate.

13. The process of claim 5, wherein said metallic salts are tin (II) chloride.

14. The process of claim 5, wherein said metallic salts are antimony (III) chloride.

15. The process of claim 5, wherein said metallic salts are chromium (III) acetate.

* * * * *